United States Patent
Frederiksen, Jr. et al.

(10) Patent No.: US 7,340,184 B2
(45) Date of Patent: Mar. 4, 2008

(54) LINEARIZED OPTICAL TRANSMITTER USING FEEDBACK CONTROL

(75) Inventors: Thomas R. Frederiksen, Jr., Hatboro, PA (US); Stephen B. Krasulick, Fogelsville, PA (US)

(73) Assignee: Optium Corporation, Horsham, PA (US)

( * ) Notice: Subject to any disclaimer, the term of this patent is extended or adjusted under 35 U.S.C. 154(b) by 651 days.

(21) Appl. No.: 10/249,709

(22) Filed: May 1, 2003

(65) Prior Publication Data

US 2004/0218931 A1    Nov. 4, 2004

(51) Int. Cl.
*H04B 10/00*    (2006.01)

(52) U.S. Cl. .................................... 398/198; 398/195

(58) Field of Classification Search ............... 398/194, 398/198; 372/38.02
See application file for complete search history.

(56) References Cited

U.S. PATENT DOCUMENTS

| | | | | |
|---|---|---|---|---|
| 4,340,854 A * | 7/1982 | Jones et al. | ................. | 324/623 |
| 4,992,754 A | 2/1991 | Blauvelt et al. | ............ | 330/149 |
| 5,115,440 A | 5/1992 | Gysel et al. | .................... | 372/38 |
| 5,132,639 A | 7/1992 | Blauvelt et al. | ............ | 330/149 |
| 5,161,044 A * | 11/1992 | Nazarathy et al. | .......... | 398/194 |
| 5,252,930 A | 10/1993 | Blauvelt | ..................... | 330/149 |
| 5,323,239 A | 6/1994 | Ward et al. | ................. | 348/607 |
| 5,361,156 A | 11/1994 | Pidgeon | ....................... | 359/161 |
| 5,373,384 A | 12/1994 | Hebert | ....................... | 359/161 |
| 5,436,749 A | 7/1995 | Pidgeon, Jr. et al. | | |
| 5,453,868 A | 9/1995 | Blauvelt et al. | ............ | 359/173 |
| 5,699,179 A | 12/1997 | Gopalakrishnan | ........... | 359/183 |
| 5,703,530 A | 12/1997 | Sato et al. | .................... | 330/149 |
| 5,812,294 A | 9/1998 | Wilson | ........................ | 359/161 |
| 5,812,297 A | 9/1998 | Mussino et al. | ............ | 359/181 |
| 5,850,305 A | 12/1998 | Pidgeon | ...................... | 359/187 |
| 5,900,621 A * | 5/1999 | Nagakubo et al. | .......... | 250/205 |
| 6,107,877 A | 8/2000 | Miguelez et al. | ............. | 330/66 |
| 6,194,942 B1 | 2/2001 | Yu et al. | ..................... | 327/317 |
| 6,288,814 B1 | 9/2001 | Blauvelt | ..................... | 359/180 |
| 6,392,779 B1 * | 5/2002 | Iannelli et al. | .............. | 359/245 |
| 6,687,466 B1 * | 2/2004 | Chiappetta | .................. | 398/193 |
| 6,842,587 B1 * | 1/2005 | McGhan et al. | ............ | 398/201 |
| 6,873,801 B1 * | 3/2005 | Yamaki et al. | ............. | 398/198 |
| 2002/0191261 A1 * | 12/2002 | Notargiacomo et al. | .... | 359/181 |
| 2003/0165285 A1 * | 9/2003 | Yu et al. | ....................... | 385/15 |

FOREIGN PATENT DOCUMENTS

| EP | 0 600 553 A1 | 6/1994 |
|---|---|---|
| WO | WO 01/50642 A1 | 7/2001 |

\* cited by examiner

*Primary Examiner*—Agustin Bello
(74) *Attorney, Agent, or Firm*—Kurt Rauschenbach; Rauschenbach Patent Law Group, LLC

(57) ABSTRACT

Apparatus and methods for linearizing an optical transmitter are described. A linearized optical transmitter according to the present invention includes a modulator bias voltage supply that biases an optical modulator. The optical modulator modulates an optical signal with a payload modulation signal. A feedback circuit receives electrical distortion signals generated by the modulator and generates a control signal in response to at least one of the electrical distortion signals. The control signal changes the bias voltage generated by the modulator bias voltage supply so as to reduce the at least one electrical distortion signal.

26 Claims, 9 Drawing Sheets

LINEARIZED OPTICAL TRANSMITTER USING FEEDBACK CONTROL

BACKGROUND OF INVENTION

Optical fiber communication systems are lightwave systems employing optical fibers to transmit information from an optical transmitter to an optical receiver. An optical transmitter for an optical fiber communication system includes an optical source, such as a semiconductor laser, that generates an optical signal and an optical modulator that modulates the optical signal with electronic data, video or voice information.

The optical transmitter also includes all of the electronics and the optics necessary to process the electronic information and modulate it onto the optical signal. The modulated optical signal is transmitted through a transmission media, such as an optical fiber, to an optical receiver. The optical receiver detects the transmitted optical signal and processes the optical signal to generate an electronic waveform that contains the data, video or voice information.

Optical fiber communication systems are now widely deployed. Recently, relatively new communication services, such as the Internet, high-speed data links, video services, wireless services and CATV, have resulted in a dramatic increase in the need for higher information data rates. The aggregate data throughput rate of a communication system can be increased either by increasing the bandwidth of an individual data channel or by increasing the number of data channels.

Many optical fiber communication systems today are being built to transmit data over long distances with higher data rates or with a larger number of data channels. Moreover, in order to reduce the capital and operating costs associated with transmitting data, such systems are currently being built to transmit data, video and voice over these longer distances without employing repeaters.

To achieve these higher data rates and longer transmission distances, a large number of channels can be used. For example, state-of-the art CATV systems transmit greater than one hundred channels over a single communication link. To transmit such a large number of channels, while maintaining signal integrity over all of the channels, the optical transmitter should be substantially linear and free of distortion.

BRIEF DESCRIPTION OF DRAWINGS

This invention is described with particularity in the detailed description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
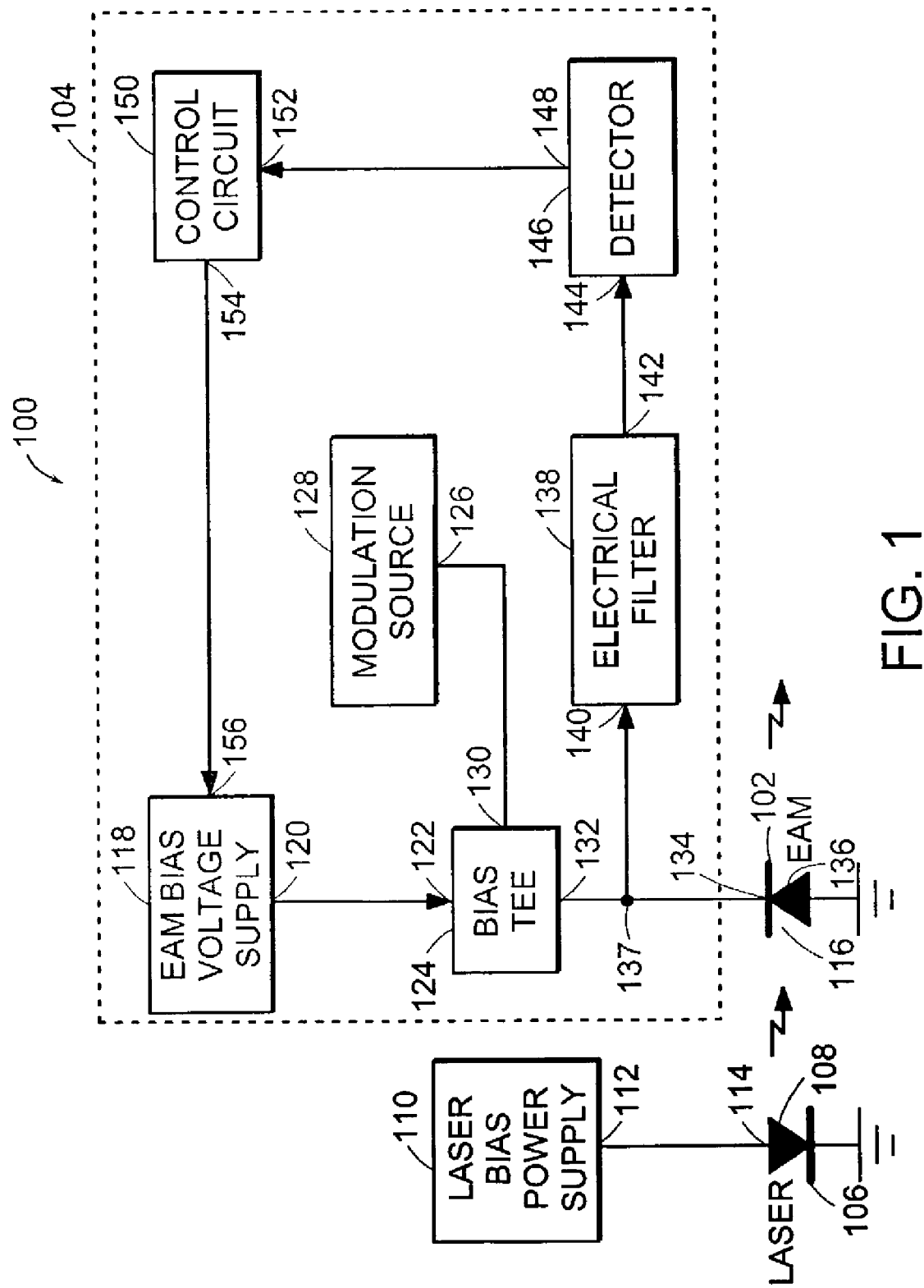
FIG. 1 illustrates a block diagram of an optical transmitter according to the present invention that includes an electro-absorption modulator (EAM) and a feedback circuit that linearizes the optical transmitter for a particular type of distortion.

There are presently many applications that require wide-bandwidth signals to be propagated over long distances with minimum distortion and with high dynamic range. For example, CATV transmission systems use channel frequencies that typically range from about 40 MHz to about 870 MHz. CATV transmission systems require a flat frequency response across channel bands of ±0.5 dB with greater than 50 dB of carrier-to-noise ratio.

Also, many CATV transmission systems require less than −67 dBc of composite second-order (CSO) distortion referenced to the carrier. The term "composite second-order distortion" is defined herein to mean any combination or superposition of distortion signals resulting from nonlinear mixing of two signals having different frequencies (i.e., $f_a \pm f_b$) within the frequency band of interest. Composite second-order distortion is a well known distortion effect in CATV transmission systems that is caused by both the optical transmitter and by the optical fiber link. Composite second-order distortion is introduced in the optical transmitter by the optical modulator. Composite second-order distortion generally increases with increasing optical intensity modulation index of the optical modulator.

In addition, many CATV transmitters require less than −70 dBc of composite triple beat (CTB) distortion signals referenced to the carrier. Composite triple beat (CTB) distortion signals are also called composite third-order distortion signals. The terms "composite third-order distortion signals" and "composite triple beat distortion signals" are defined herein to mean a superposition or composite of third-order distortion signals resulting from the nonlinear mixing of two or three different frequencies (i.e., $mf_a \pm nf_b$, where m and n are integers having a sum equal to three or $f_a \pm f_b \pm f_c$) within the frequency band of interest.

Composite triple beat distortion is caused when second harmonic signals combine with a fundamental signal. Composite triple beat distortion is also caused when three fundamental signals combine. Composite triple beat distortion can appear as low-frequency interference on video signals. Composite triple beat distortion generally increases as the number of channels increases. Many second-order and third order distortion products are present in narrow frequency bands or essentially at a single frequency because of typical frequency assignments used in commercial communication systems.

The present invention relates to methods and apparatus for propagating wide-bandwidth signals with minimum distortion and with high dynamic range. In particular, the present invention relates to methods and apparatus for reducing or minimizing distortions, such as CSO and CTB distortions, which are generated by the optical transmitter, while maintaining a high dynamic range.

Predistortion circuits can be used to linearize an optical transmitter to achieve wide-bandwidth transmission with minimum distortion and high dynamic range. One method of linearizing an optical transmitter with a predistortion circuit generates a predistortion signal that is equal in magnitude and opposite in phase to the distortion introduced by the optical transmitter. The predistortion signal is combined with an electrical modulation signal to reduce the distortion. The predistortion signal can be generated automatically or manually.

One type of predistortion circuit splits the electrical modulation signal into a time delay signal path and a distortion signal path. A time delay generator is positioned in the time delay signal path. The time delay generator generates a time delay in the time delay signal path that is equal to the time delay in the distortion signal path.

A distortion generator is positioned in the distortion signal path. The distortion generator can include a single diode or at least one pair of diodes that generate second and third-order distortion. For example, a single Schottky diode or varactor diode can be used to generate second-order distortion. A Schottky diode pair can be used to generate real third-order distortion and a varactor diode pair can be used to generate imaginary third-order distortion. The distortion generator changes parameters, such as the amplitude, frequency, tilt and phase of the electrical modulation signal to generate a predistortion signal that is approximately equal in magnitude and opposite in phase to the distortion introduced by the optical transmitter.

The time delayed signal and the predistortion signal are then combined. The combined signal includes the predistortion signal that compensates for the nonlinearity of the transmission device superimposed on the electrical modulation signal. The combined signal is modulated by the modulator. The resulting modulated signal has reduced distortion.

Another type of predistortion circuit splits the modulator drive circuit into three electrical paths: a primary path; an even-order secondary path; and an odd-order secondary path. The even-order secondary path includes a distortion generator that generates even-order intermodulation products. The odd-order secondary path includes a distortion generator that generates odd-order intermodulation products. The primary path includes a time delay generator that generates a time delay that is equal to the time delay in the even-order and the odd-order secondary paths.

The signals generated by the distortion generator in the even-order secondary path, by the distortion generator in the odd-order secondary path, and by the delay generator in the primary path are combined. The combined signal includes a predistortion signal that compensates for nonlinearities of the transmission device that are caused by frequency dependent amplitude distortion, frequency dependent phase distortion, and distortion caused by higher-order intermodulation products.

Another type of predistortion circuit uses an antiparallel arrangement of two diodes to cancel both third and fifth-order intermodulation distortion attributable to the optical transmitter. The diode arrangement is biased close to the modulator quadrature point. By varying the bias current in the vicinity of the null, circuit parameters are modified to change the relative magnitude or phase of the third or fifth-order intermodulation distortion.

Yet another type of predistortion circuit uses a piloting circuit that generates a bias control feedback signal to the modulator. The piloting circuit generates a pilot tone and combines the pilot tone with an electrical signal generated by detecting the modulated optical signal to generate the bias control signal. The bias control signal is fed back to the modulator to tune the operating point of the modulator to parametrically reduce distortion.

Such predistortion circuits attempt to compensate for distortion generated by the optical modulator. However, these types of predistortion circuits cannot compensate for all types of distortion. In addition, such predistortion circuits are relatively complex because they require extraordinary dynamic range in order to linearize the optical transmitter.

A linearized optical transmitter according to the present invention directly reduces the distortion generated by the modulator rather than just compensating for the distortion generated by the modulator. The linearized optical transmitter according to the present invention directly measures the distortion generated by the optical modulator and actively feeds back a signal that controls the bias point of the modulator so as to cause the modulator to reduce or minimize the generation of certain distortions.

In one embodiment, a linearized optical transmitter according to the present invention includes a modulator and a feedback circuit that is used to maintain the operating point of the modulator at a level that reduces or minimizes distortion. In one embodiment, the structure of the modulator itself is modified to reduce distortions.

The linearized optical transmitter of the present invention reduces the complexity and the dynamic range requirements for the predistortion circuitry. In addition, in one embodiment, a linearized optical transmitter according to the present invention does not generate an in-band residual signal that can interfere with transmission.

FIG. 1 illustrates a block diagram of an optical transmitter 100 according to the present invention that includes an optical modulator, such as an electro-absorption modulator (EAM) 102 and a feedback circuit 104 that linearizes the optical transmitter 100 for a particular type of distortion. The optical transmitter 100 includes a laser 106 that generates an optical signal at an output 108. The laser 106 can be any type of laser. A laser bias power supply 110 is electrically coupled to the laser 106. An output 112 of the laser bias power supply 110 is electrically coupled to a bias input 114 of the laser 106.

The laser bias power supply 110 generates a bias signal at the output 112 that biases the laser 106 at the appropriate operating point so that it emits an optical signal at the output 108 that has the desired wavelength and the desired power level. In some embodiments, the output 112 of the laser bias power supply 110 is controlled to reduce distortion as described herein.

The linearized optical transmitter 100 of the present invention is described in connection with an EAM 102. However, the present invention can be practiced with other types of optical transmitters that generate electrical currents that are proportional to distortion products. The optical transmitter 100 includes an EAM 102 having an input 116 that is in optical communication with the output 108 of the laser 106. An EAM 102 is a semiconductor modulator that uses modulation effects, such as the Franz-Keldysh effect or the quantum-confined Stark effect to modulate an electrical signal onto an optical signal.

Persons skilled in the art can appreciate that the transfer characteristics of an EAM can be modified by changing various physical parameters of the active layer. The transfer characteristics of an EAM can also be modified by changing the EAM's operating conditions, such as the bias voltage applied to the EAM and the temperature of the semiconductor active layer.

An EAM bias voltage supply 118 is electrically coupled to the EAM 102. An output 120 of the EAM bias voltage supply 118 is electrically coupled to a first input 122 of a bias tee 124. The EAM bias voltage supply 118 generates a bias voltage that is used to bias the EAM 102 at the desired operating point.

An output 126 of a modulation source 128 is electrically connected to a second input 130 of the bias tee 124. The modulation source 128 generates a payload modulation signal that is used to modulate information onto the optical signal generated by the laser 106. An output 132 of the bias tee 124 is electrically coupled to an electrical input 134 of the EAM 102. The bias tee 124 combines the EAM bias voltage with the payload modulation signal to generate a driving signal for the EAM 102.

The EAM 102 generates a payload modulated optical signal at an output 136. The EAM 102 also generates an electrical signal that is proportional to the payload modulation signal. In addition, the EAM 102 generates electrical distortion signals caused by non-linear effects, such as when photons are absorbed in the active area of the EAM 102.

The optical transmitter 100 also includes a feedback circuit 104 that is responsive to the electrical distortion signals generated by non-linear effects within the EAM 102. The feedback circuit 104 includes an electrical filter 138 that is electrically connected to the EAM 102 at a port 137. In one embodiment, an input 140 of the filter 138 is electrically connected to the output 132 of the bias tee 124 and the input 134 of the EAM 102, as shown in FIG. 1. However, in other embodiments (not shown), the input 140 of the filter 138 is electrically connected to a separate port of the EAM that generates electrical distortion signals.

The filter 138 is designed to transmit at an output 142 a group of electrical distortion signals that are generated by the non-linear effects within the EAM 102 and designed to reject substantially all other signals. In one embodiment, the filter 138 transmits CSO or CTB distortion signals at the output 142.

The composite second-order distortion signals and composite triple beat signals have frequencies in relatively narrow bands near the carrier frequency that are repeated throughout the entire spectrum. These signals can be filtered as a group by the filter 138. An input 144 of a detector 146 is electrically connected to the output 142 of the filter 138. The detector 146 generates an electrical feedback signal at an output 148 that is proportional to the signals transmitted by the filter 138. The electrical feedback signal is proportional to the strength of the group of electrical distortion signals.

The feedback circuit 104 includes a control circuit 150. An input 152 of the control circuit 150 is electrically connected to the output 148 of the detector 146. An output 154 of the control circuit 150 is electrically connected to a control input 156 of the EAM bias voltage supply 118. The control circuit 150 receives the electrical feedback signal generated by the detector 146 and converts the feedback signal generated by the detector 146 into a signal that controls the EAM bias voltage supply 118.

In one embodiment, the control circuit 150 includes a nulling servo circuit that is designed to null the electrical feedback signal generated by the detector 146. In one embodiment, the control circuit 150 includes a circuit to adjust the EAM modulator bias so that the distortion products in the electrical feedback signal or a component of the electrical feedback signal that is generated by the detector 146 are minimized.

In one embodiment, the control circuit 150 receives the electrical feedback signal generated by the detector 146 and processes the electrical feedback signal according to an algorithm. For example, the control circuit 150 can process the feedback signal according to an algorithm that causes the control circuit 150 to generate a control signal that reduces or minimizes CSO distortion signals, CTB distortion signals, fifth-order distortion signals, or any combination of distortion signals generated by non-linear effects within the EAM 102.

The control signal generated by the control circuit 150 is applied to the control input 156 of the EAM bias voltage supply 118. The EAM bias voltage supply 118 generates an EAM bias voltage that biases the EAM 102 at a bias point that reduces or minimizes electrical distortion signals generated by non-linear effects within the EAM 102.

In operation, the laser bias power supply 110 generates a bias signal at the output 112 that biases the laser 106 at the appropriate operating point so that it emits an optical signal with the desired wavelength and desired power level. The EAM bias voltage supply 118 generates a bias voltage that is sufficient to bias the EAM 102 at the desired initial operating point. The modulation source 128 generates the desired payload modulation signal. The bias tee 124 combines the EAM bias voltage with the payload modulation signal and generates the driving signal for the EAM 102. The driving signal is applied to the EAM 102. The EAM 102 then modulates the optical signal generated by the laser 106 with the payload modulation signal.

The feedback circuit 104 generates the control signal and applies the control signal to the EAM bias voltage supply 118. The filter 138 transmits the electrical distortion signals to the detector 146. The detector 146 generates an electrical feedback signal that is proportional to the electrical distortion signal. The control circuit 150 receives the electrical feedback signal generated by the detector 146 and converts the electrical feedback signal into the control signal that is fed back to the EAM bias control power supply 118.

In one embodiment, the feedback circuit 104 causes the EAM bias voltage supply 118 to generate and maintain a bias voltage at the output 120 that biases the EAM 102 at a distortion null. For example, in one embodiment, feedback circuit 104 causes the EAM bias voltage supply 118 to generate and maintain a bias voltage at the output 120 that biases the EAM 102 at the distortion null for CSO distortion, CTB distortion, fifth-order distortion signals, or any combination of distortion signals generated by non-linear effects within the EAM 102.

In this example, the filter 138 is designed to transmit the CSO distortion, CTB distortion, fifth-order distortion signals, or the combination of distortion signals generated by non-linear effects within the EAM 102 to the detector 146. The detector 146 generates an electrical feedback signal that is proportional to the electrical distortion signals. The control circuit 150 receives the electrical feedback signal generated by the detector 146 and converts the electrical feedback signal into the control signal that is fed back to the EAM bias control power supply 118.

The control signal causes the EAM bias voltage supply 118 to change the EAM bias voltage to a voltage that minimizes the signal that is detected by the detector 146. Minimizing the signal that is detected by the detector 146 maintains the bias point of the EAM 102 at the distortion null for the CSO distortion, CTB distortion, fifth-order distortion signals, or the combination of distortion signals generated by non-linear effects within the EAM 102.

Figure 2:
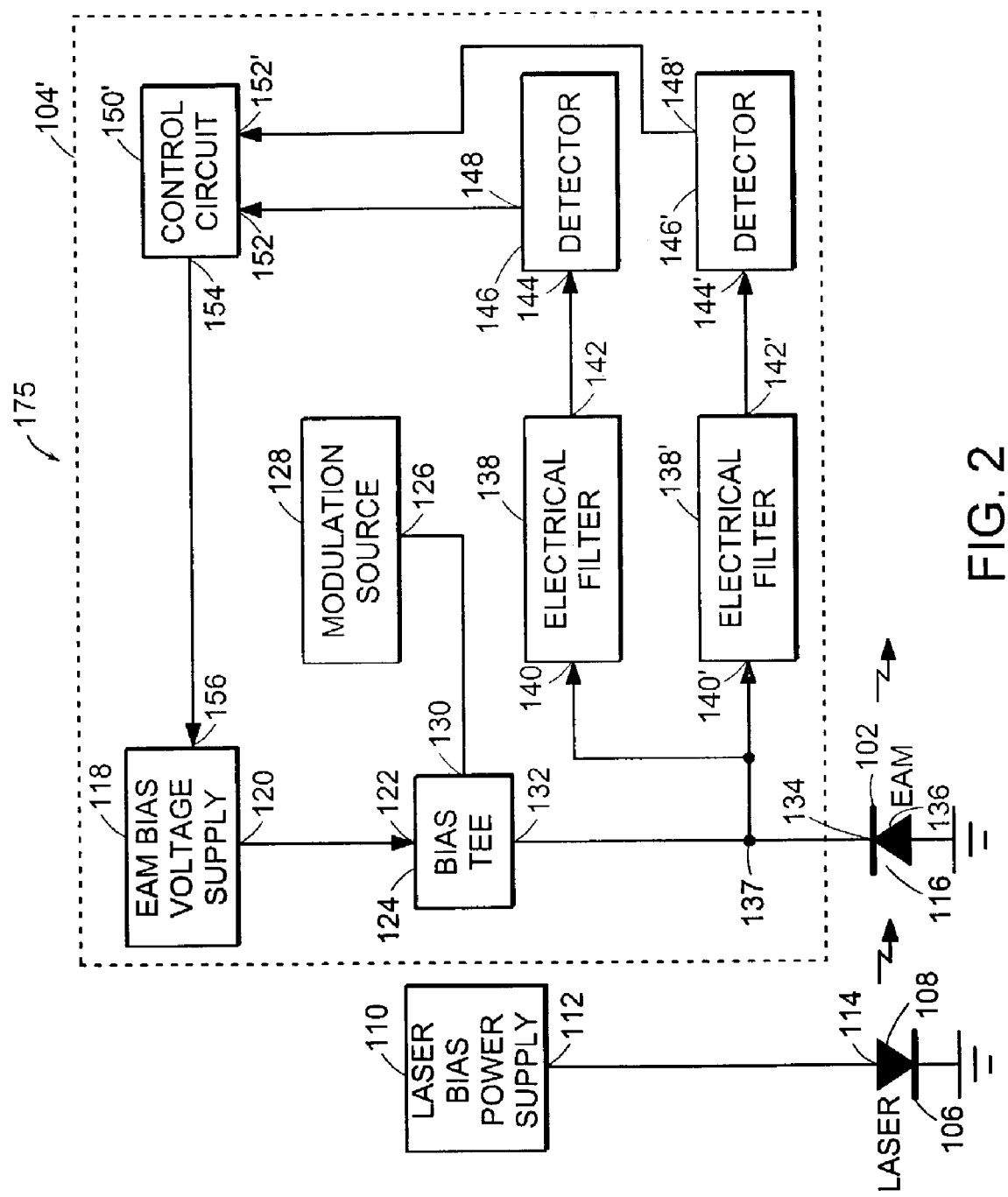
FIG. 2 illustrates a block diagram of another optical transmitter according to the present invention that includes the EAM and a feedback circuit that linearizes the optical transmitter for more than one type of distortion.

FIG. 2 illustrates a block diagram of another linearized optical transmitter 175 according to the present invention that includes the EAM 102 and a feedback circuit 104' that linearizes the optical transmitter 175 for more than one type of distortion. The optical transmitter 175 is similar to the optical transmitter 100 of FIG. 1 except that the optical transmitter 175 includes a feedback circuit 104' that includes an additional electrical filter 138' and an additional detector 146'.

An input 140' of the electrical filter 138' is electrically connected to the port 137 of the EAM 102. The filter 138' is designed to transmit at an output 142' a second group of electrical distortion signals that are generated by the non-linear effects within the EAM 102 and designed to reject substantially all other signals. In one embodiment, the filter 138' transmits CSO or CTB distortion signals at the output 142'.

An input 144' of a detector 146' is electrically connected to the output 142' of the filter 138'. The detector 146' generates a second electrical feedback signal at an output 148' that is proportional to the signals transmitted by the filter 138'. The second electrical feedback signal is proportional to the strength of the second group of electrical distortion signals.

An input 152' of the control circuit 150' is electrically connected to the output 148' of the detector 146'. The control circuit 150' receives the electrical feedback signal generated by the detector 146' in addition to the electrical feedback signal generated by the detector 146. The control circuit 150' converts the feedback signals generated by the detectors 146, 146' into a signal that controls the EAM bias voltage supply 118.

In one embodiment, the control circuit 150' receives the electrical feedback signals generated by the detectors 146, 146' and processes the electrical feedback signals according to an algorithm that determines whether the group of distortion signals passed by the filter 138 or the second group of distortion signals passed by the filter 138' is the most significant group of distortion signals in the frequency band of interest. By most significant group of distortion signals, we mean the group of electrical distortion signals that causes the most reduction in the spurious free dynamic range in the frequency band of interest. In some narrowband systems, CTB or higher-order distortion signals cause more reduction in the spurious free dynamic range than CSO distortion signals.

In another embodiment, the control circuit 150' receives the electrical feedback signals generated by the detectors 146, 146' and processes the electrical feedback signals according to an algorithm that combines the two signals to more accurately determine the best null for a given distortion product. The control circuit 150' then converts the electrical feedback signal generated by the detector that detects the most significant group of distortion signals according to the algorithm into the signal that controls the EAM bias voltage supply 118. In this embodiment, the most significant of the two groups of distortion signals generated by non-linear effects within the EAM 102 is reduced or minimized.

For example, in one embodiment, the filter 138 passes a group of CSO distortion signals and the filter 138' passes a group of CTB distortion signals. The control circuit 150' processes the electrical feedback signals generated by the detectors 146, 146' according to an algorithm that determines whether the CSO or the CTB distortion signal is the most significant distortion signal. The algorithm then causes the control circuit 150' to generate a control signal that reduces or minimizes the most significant distortion signals in the frequency band of interest.

In another embodiment, the filter 138 passes a first group of CSO distortion signals and the filter 138' passes a second group of CSO distortion signals. The control circuit 150' processes the electrical feedback signals generated by the detectors 146, 146' according to an algorithm that determines whether the first or the second group of CSO distortion signals is the most significant group of CSO distortion signals. The algorithm then causes the control circuit 150' to generate a control signal that reduces or minimizes the most significant group of CSO distortion signals in the frequency band of interest.

Figure 3:
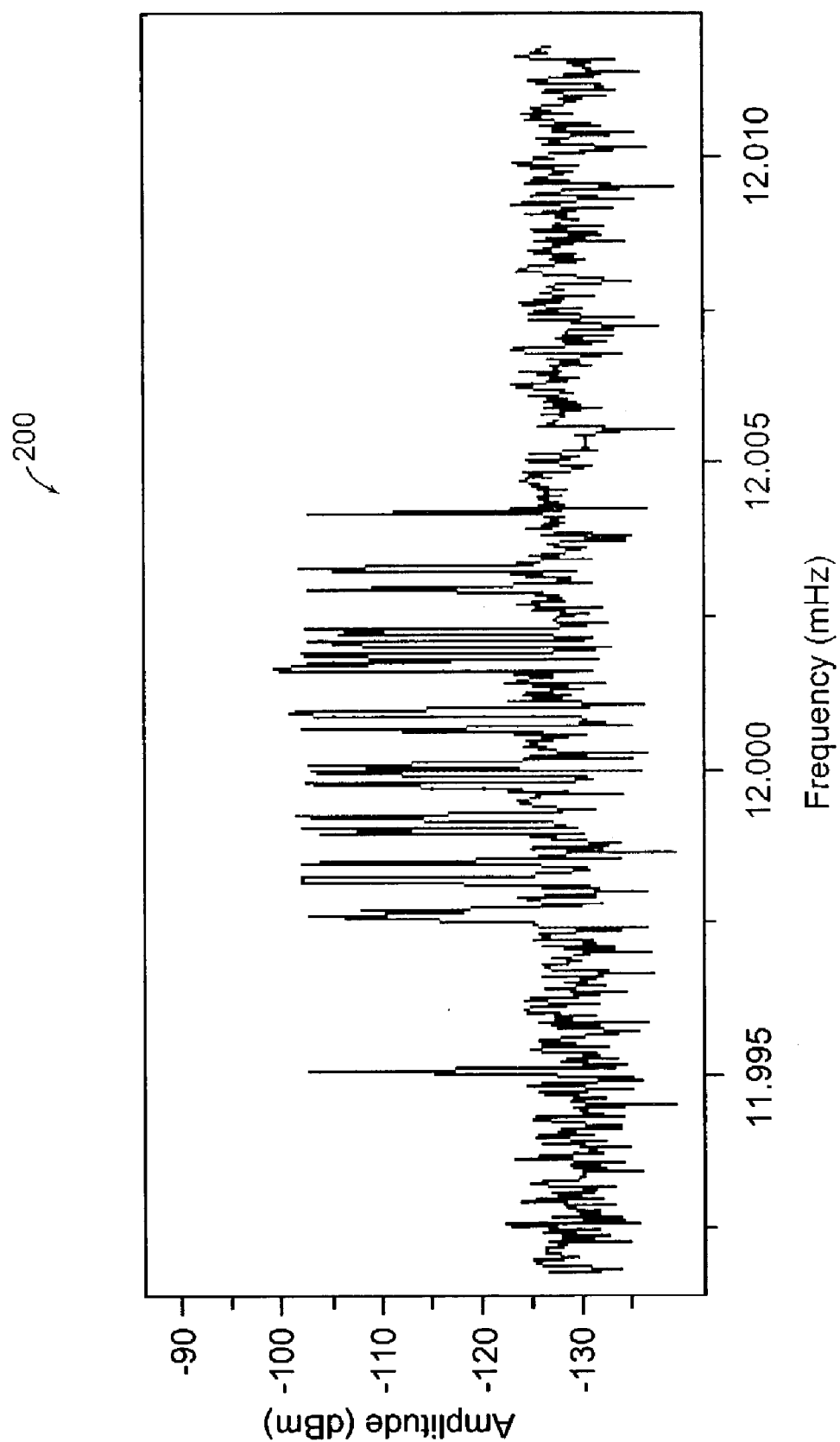
FIG. 3 illustrates experimental data for a portion of the RF spectrum of an optical signal generated by the optical transmitter of FIG. 1 with the EAM biased below the composite second-order (CSO) null.
Figure 4:
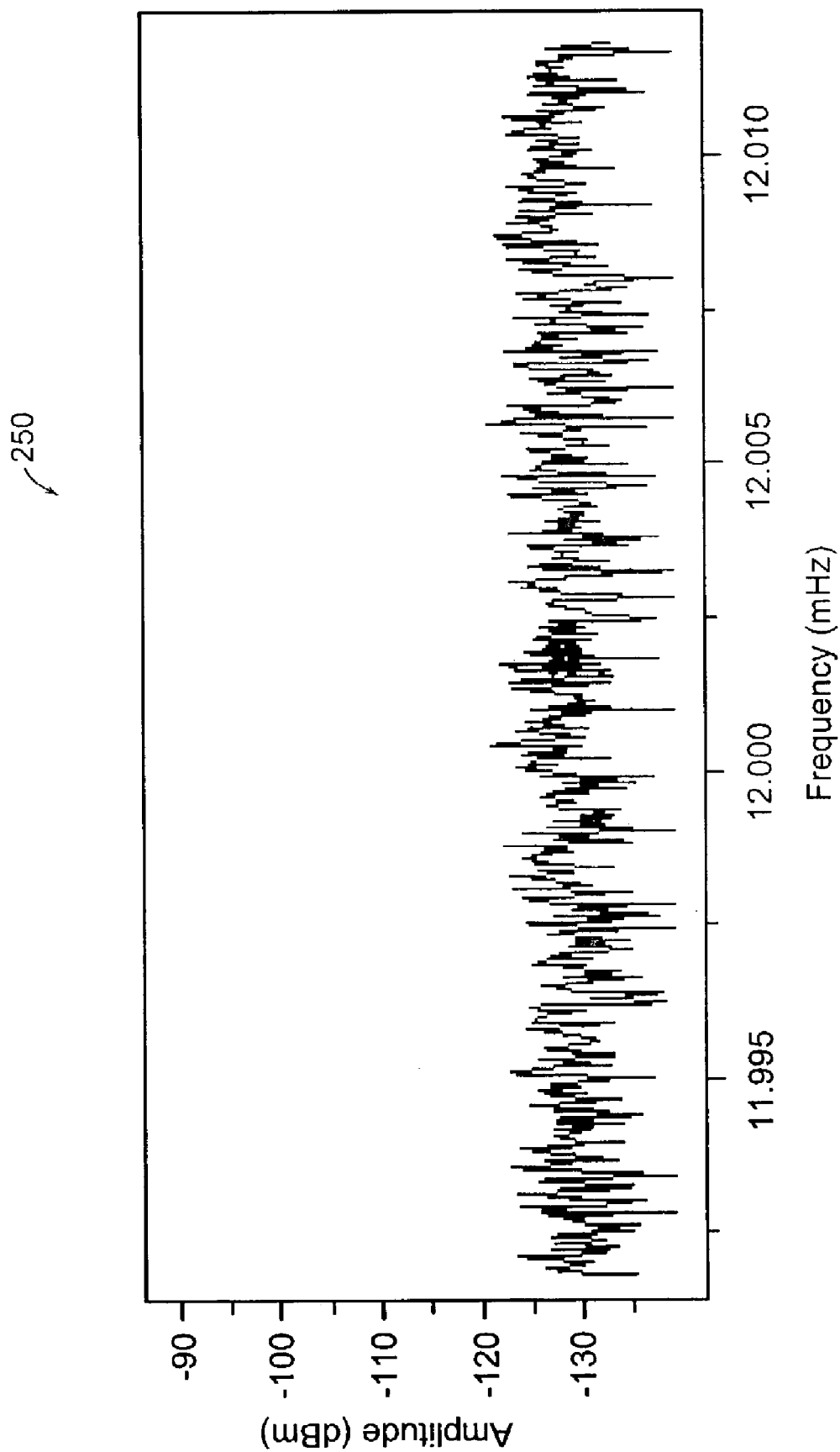
FIG. 4 illustrates experimental data for a portion of the RF spectrum of an optical signal generated by the optical transmitter of FIG. 1 with the EAM biased at the CSO null to minimize the CSO distortion.
Figure 5:
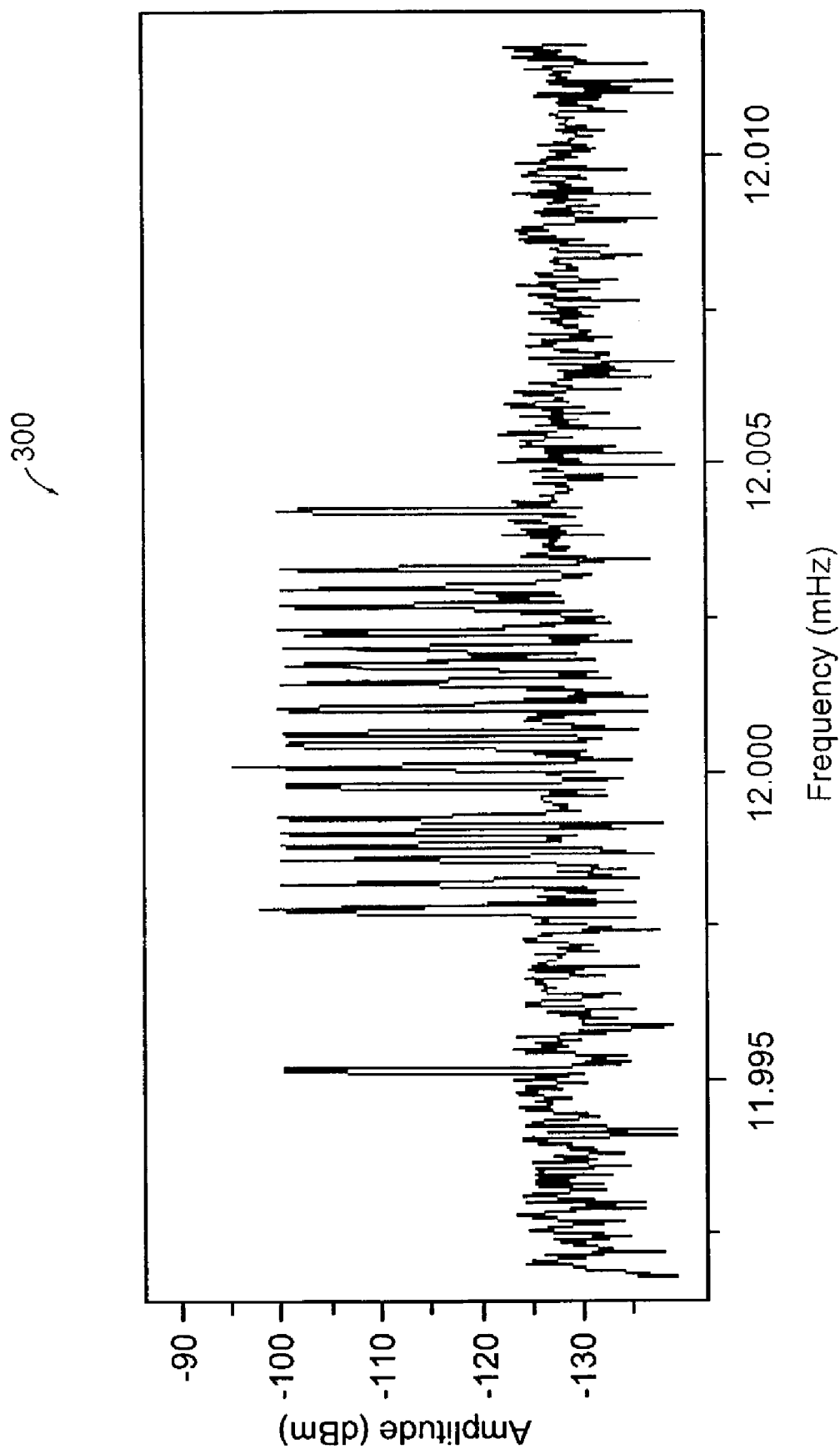
FIG. 5 illustrates experimental data for a portion of the RF spectrum of an optical signal generated by the optical modulator of FIG. 1 with the modulator biased above the CSO null.

FIG. 3 through FIG. 5 illustrate experimental data that shows linearization of an EAM for CSO products according to the present invention. Data is presented for a portion of the RF spectrum that shows distortion caused by CSO products when the EAM is biased at three different bias levels. FIG. 3 shows that significant CSO products are present in the portion of the RF spectrum when the EAM is biased below the CSO null. FIG. 4 shows that CSO products can be greatly reduced when the EAM is biased at the CSO null. FIG. 5 shows that significant CSO products are present in the portion of the RF spectrum when the EAM is biased above the CSO null.

Although experimental data is shown for linearizing an optical transmitter including an EAM for CSO distortion, the present invention can be used to linearize an optical transmitter including an EAM for other types of distortion, such as CTB distortion, fifth-order distortion, and any combination of distortion products. In addition, the methods of the present invention can be used to linearize optical transmitters including other types of modulators that generate signals related to distortion products.

FIG. 3 illustrates experimental data for a portion of the RF spectrum 200 of an optical signal generated by the optical transmitter 100 of FIG. 1 with the EAM 102 biased below the CSO null. The filter 138 rejected the band of second-order distortion products and caused the feedback circuit 104 to generate a control signal that instructed the EAM bias voltage supply 118 to generate a voltage that was below the CSO null. Consequently, the EAM bias voltage maintained the bias point of the EAM 102 at a level that did not reduce the CSO distortion generated by non-linear effects within the EAM 102.

The portion of the RF spectrum 200 shows RF amplitude as a function of frequency for signals generated by the EAM 102. The portion of the RF spectrum 200 indicates a significant level of CSO distortion products around 12 MHz. Thus, when the EAM 102 is biased below the CSO null, the resulting portion of the RF spectrum 200 includes a band of spurious signals caused by CSO distortion.

FIG. 4 illustrates experimental data for a portion of the RF spectrum 250 of an optical signal generated by the optical transmitter 100 of FIG. 1 with the EAM biased at the CSO null to minimize the CSO distortion. The filter 138 passed the band of second-order distortion products and caused the feedback circuit 104 to generate a control signal that instructed the EAM bias voltage supply 118 to generate a voltage that biased the EAM at the CSO null. Consequently, the EAM 102 generated a portion of the RF spectrum with minimum CSO distortion generated by non-linear effects within the EAM 102.

The portion of the RF spectrum 250 shows RF amplitude as a function of frequency for signals generated by the EAM 102. The portion of the RF spectrum 250 indicates a significant reduction of spurious signals caused by CSO distortion products around 12 MHz. Thus, when the EAM 102 is biased at the CSO null, the resulting portion of the RF spectrum 250 has reduced spurious signals caused by CSO distortion.

FIG. 5 illustrates experimental data for a portion of the RF spectrum 300 of an optical signal generated by the optical transmitter 100 of FIG. 1 with the EAM 102 biased above the CSO null. The filter 138 rejected the band of second-order distortion products and caused the feedback circuit 104 to generate a control signal that instructed the EAM bias voltage supply 118 to generate a voltage that was above the CSO null. Consequently, the EAM bias voltage maintained the bias point of the EAM 102 at a level that did not reduce the CSO distortion generated by non-linear effects within the EAM 102.

The portion of the RF spectrum 300 shows RF amplitude as a function of frequency for signals generated by the EAM 102. The portion of the RF spectrum 300 indicates significant spurious signals caused by CSO distortion products as one band of spurious signals that is present at approximately 6 MHz intervals. Such a RF spectrum is common for most U.S. CATV channel plans. Thus, when the EAM 102 is biased above the CSO null, the resulting portion of the RF spectrum 300 includes a band of spurious signals caused by CSO distortion.

Figure 6:
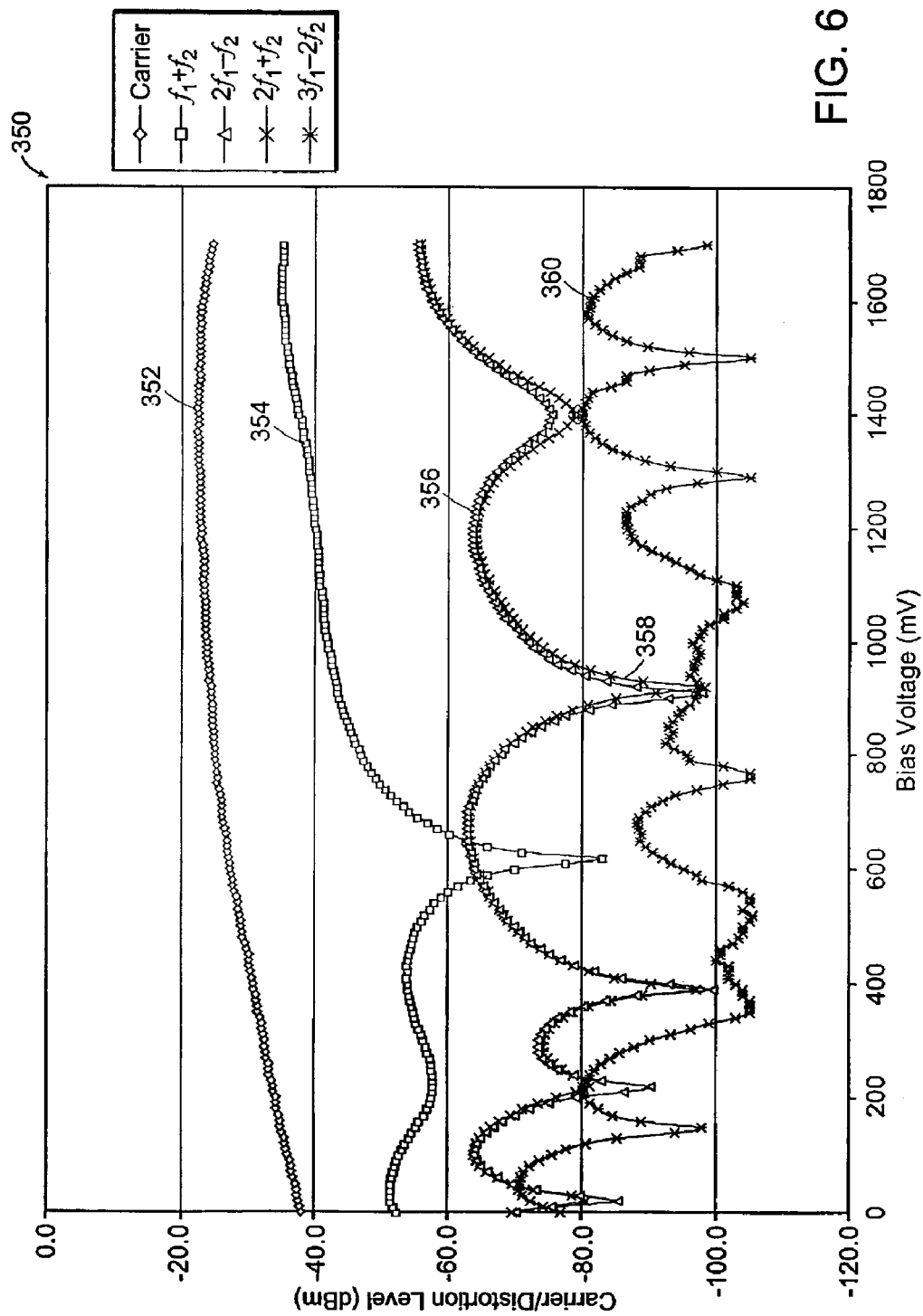
FIG. 6 illustrates experimental data for carrier and distortion power levels as a function of bias voltage for the optical transmitter of FIG. 1 with the EAM modulating a first carrier $f_1$ at 55.25 MHz and a second carrier $f_2$ at 61.25 MHz.

FIG. 6 illustrates experimental data 350 for carrier and distortion power levels as a function of bias voltage for the optical transmitter 100 of FIG. 1 with the EAM 102 modulating a first carrier $f_1$ at 55.25 MHz and a second carrier $f_2$ at 61.25 MHz. The data 350 illustrates the carrier signal power level 352 as a function of bias voltage. The carrier signal power level 352 generally increases with increased bias voltage. However, at relatively high bias voltage levels, the carrier signal power level 352 slightly decreases. For many telecommunications applications, it is desirable to drive the EAM 102 with a relatively high bias voltage in order to maximize the voltage swing and concomitant depth of modulation.

In addition, the data 350 illustrates power levels of CSO, CTB and fifth-order distortion signals as a function of bias voltage. The data 350 shows a CSO distortion signal power level 354 as a function of bias voltage. The power of the CSO distortion signal is proportional to the number of second-order intermodulation distortion products and to the amplitude of each intermodulation distortion product. The frequency of the second-order products is either the sum or the difference of the frequency of the two signals causing the second-order intermodulation distortion products. The data 350 also shows a first CTB distortion signal power level 356 as a function of bias voltage. The first CTB distortion signal power level 356 represents the power of the signal having a frequency that is equal to the difference between twice the first carrier frequency signal and the second carrier frequency signal.

Also, the data 350 shows a second CTB distortion signal power level 358 as a function of bias voltage. The second CTB distortion signal power level 358 represents the power of the signal having a frequency that is equal to the sum of twice the first carrier frequency signal and the second carrier frequency signal. Furthermore, the data 350 shows a fifth-order distortion signal power level 360 as a function of bias voltage. The fifth-order distortion signal power level 360 represents the power of a signal having a frequency that is equal to the difference between three times the first carrier frequency signal and two times the second carrier frequency signal as a function of bias voltage.

The data 350 indicate that the power levels of the distortion signals 354, 356, 358, and 360 change with the bias voltage applied to the EAM 102. Therefore, the amount of channel loading at a given modulation depth per channel that can be applied is a function of the bias voltage. An EAM bias voltage can be chosen so as to minimize a particular type of distortion, such as CSO, CTB, and fifth-order distortion.

An optical transmitter according to the present invention reduces or minimizes distortion by using the feedback circuit 104 (FIG. 1) to cause the EAM bias voltage supply 118 (FIG. 1) to generate an EAM bias voltage that reduces or minimizes certain types of distortions that are caused by non-linear effects in the EAM 102. The data 350 shows that there exists a CSO distortion null at a power level of approximately −85 dBm that occurs at a bias voltage of approximately −650 mV. The term "distortion null" is defined herein to mean a minimum distortion power level. Thus, the data 350 indicates that the optical transmitter 100 of FIG. 1 can minimize CSO distortion by generating a signal that causes the EAM bias voltage supply 118 to generate an EAM bias voltage that is approximately −650 mV.

The −650 mV EAM bias voltage level results in a carrier signal power level 352 that is about −30 dBm and a CSO distortion signal power level 354 that is about −85 dBm. Therefore, when the EAM 102 is biased at −650 mV, the CSO distortion power level is approximately −55 dBc below the carrier signal power level. The −650 mV bias level results in a minimum of CSO distortion. Thus, CSO distortion can be reduced or minimized by selecting the appropriate EAM bias voltage level. Similarly, CTB and fifth-order distortion can be reduced or minimized by selecting the appropriate EAM bias voltage level.

Figure 7:
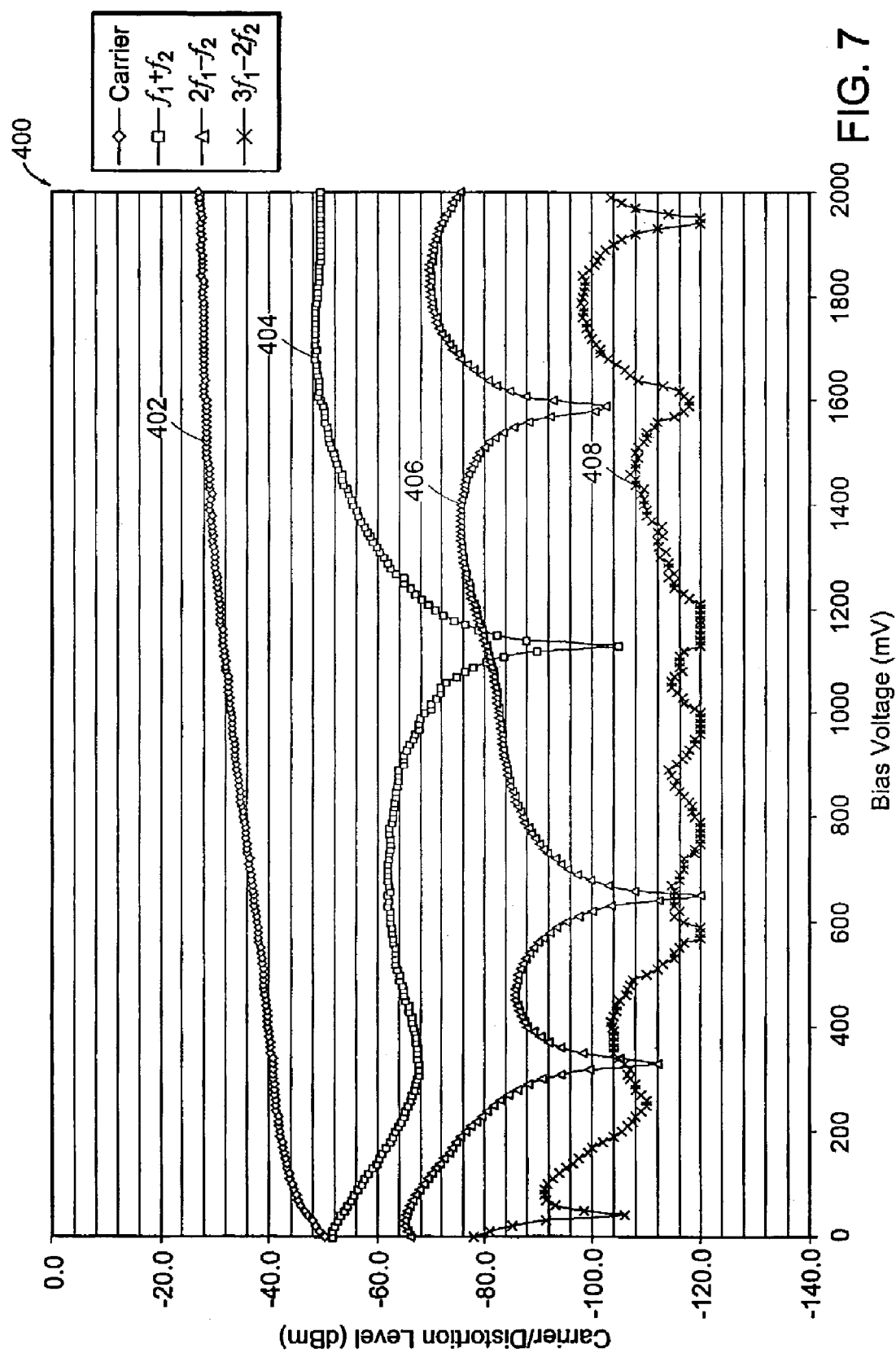
FIG. 7 illustrates experimental data for carrier and distortion power levels as a function of bias voltage for the optical transmitter of FIG. 1 modulating a first carrier $f_1$ at 55.25 MHz and a second carrier $f_2$ at 61.25 MHz with an EAM modified according to the present invention.

The portion of the RF spectrum generated by the EAM 102 (FIG. 1) can also be changed by modifying the composition and structure of the semiconductor active region of the EAM 102. FIG. 7 illustrates experimental data 400 for carrier and distortion power levels as a function of bias voltage for the optical transmitter 100 of FIG. 1 modulating a first carrier $f_1$ at 55.25 MHz and a second carrier $f_2$ at 61.25 MHz with an EAM 102 modified according to the present invention.

The experimental data 400 for carrier and distortion power levels as a function of bias voltage indicates a reduction in distortion signals compared with the data 350 presented in FIG. 6. In addition, the experimental data 400 indicates an increase in the allowable bias voltage, which increases the voltage swing and concomitant depth of modulation.

The data 400 illustrates the carrier signal power level 402 as a function of bias voltage. The carrier signal power level 402 generally increases with increased bias voltage. The data 400 also illustrates power levels of CSO and CTB distortion signals as a function of bias voltage. The data 400 shows a CSO distortion signal power level 404 as a function of bias voltage. The CSO distortion signal power level 404 represents the power of a signal having a frequency that is equal to the sum of the first and second carrier signal frequencies.

The data 400 also shows CTB distortion signal power level 406 as a function of bias voltage. The CTB distortion signal power level 406 represents the power of a signal having a frequency that is equal to the difference between twice the first carrier frequency signal and the second carrier frequency signal. Furthermore, the data 400 shows a fifth-order distortion signal power level 408 as a function of bias voltage. The fifth-order distortion signal power level 408 represents the power of a signal having a frequency that is equal to the difference between three times one carrier frequency signal (i.e., 3 $f_1$ or 3 $f_2$) and two times the other carrier frequency signal (i.e., 2 $f_2$ or 2 $f_1$) as a function of bias voltage.

The data 400 shows that there exists a CSO distortion null at a power level of approximately −105 dBm that occurs at a bias voltage of approximately −1.1V. The data 400 represents an increase in the magnitude of negative bias voltage of the CSO distortion null compared with the data 350 for the unmodified EAM 102 that was described in connection with FIG. 6. Specifically, the data 400 represents a decrease in the ratio of CSO distortion power level to carrier power level compared with the data 350 for the unmodified EAM 102 that was described in connection with FIG. 6. Also, the data 400 represents an increase in the corresponding negative bias voltage point from about −650 mV to about −1.1V that results in the CSO distortion null compared with the data 350 for the unmodified EAM 102 that was described in connection with FIG. 6.

The data 400 illustrates that when the EAM bias voltage supply 118 (FIG. 1) generates a bias voltage of −1.1V and applies that bias voltage to the modified EAM 102, a CSO distortion level of approximately 73 dBc below the carrier is achieved. The data 400 shown in FIG. 7 represent approximately an 18 dB improvement in CSO distortion level and an increase of approximately 500 mV in applied bias voltage compared to the data 350 of FIG. 6 for the unmodified EAM 102.

Thus, the composition and structure of the semiconductor active region of the EAM 102 can be modified to reduce the level of certain types of distortion signals, such as CSO distortion signals. In addition, the composition and structure of the semiconductor active region of the EAM 102 can increase the negative bias voltage that results in the minimum CSO distortion signal. The increase in negative bias voltage allows for greater peak-to-peak modulation voltages and, thus optical modulation depth. The increased optical modulation depth results in a higher carrier-to-noise ratio.

In one embodiment, the optical transmitter of the present invention uses a semiconductor optical amplifier (SOA) to amplify optical signals fed to the EAM 102. In this embodiment, the CSO distortion generated by the EAM 102 is a function of the change in intensity of the optical signal amplified by the SOA and fed to the EAM 102. In this embodiment, the operating point of the SOA is adjusted so as to generate an amplified optical signal that has a constant optical power in order to minimize distortions signals generated by the EAM.

Figure 8:
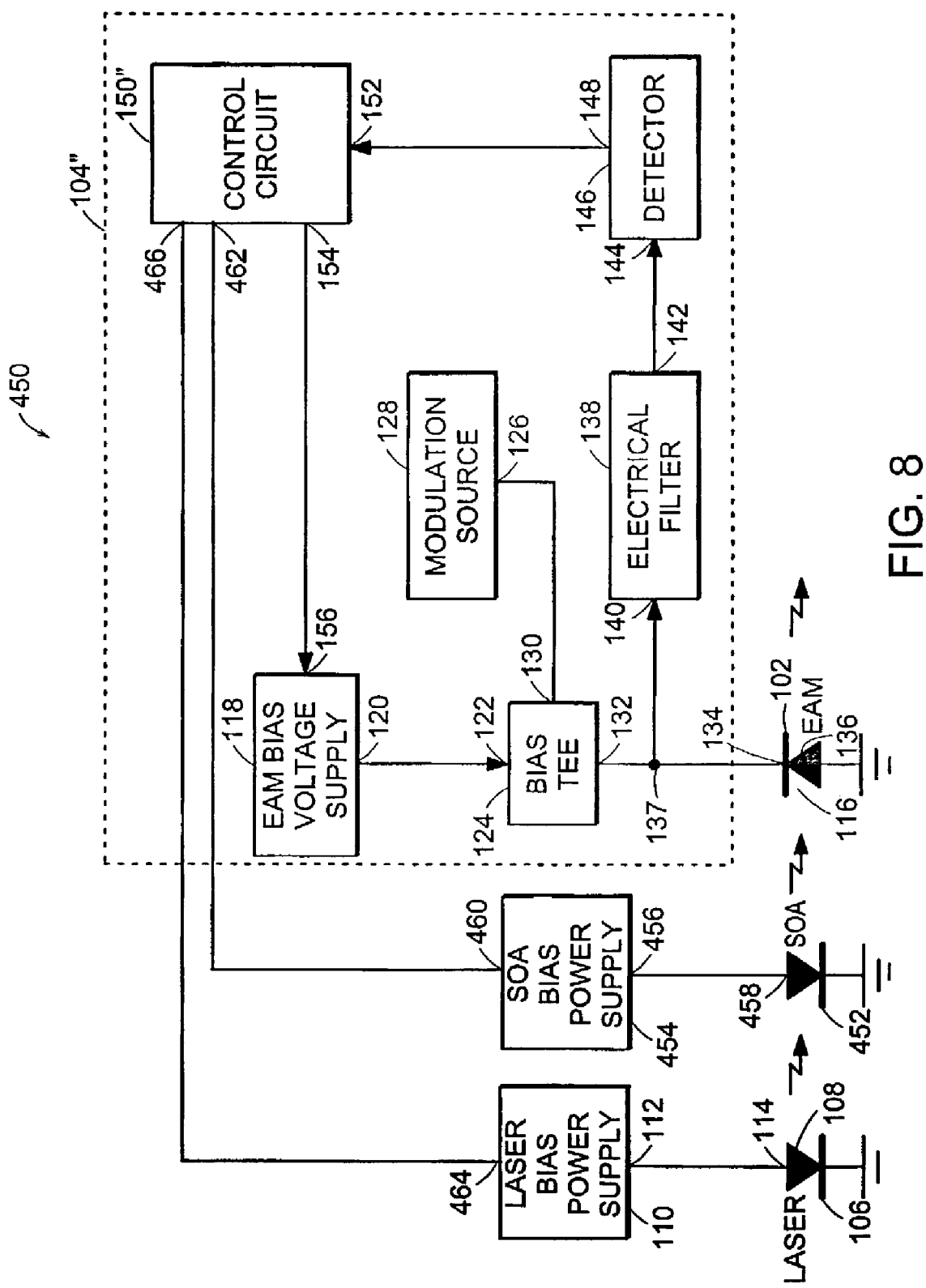
FIG. 8 illustrates a block diagram of another optical transmitter according to the present invention that includes the EAM, semiconductor optical amplifier (SOA), and a feedback circuit that linearizes the optical transmitter.

FIG. 8 illustrates a block diagram of another optical transmitter 450 according to the present invention that includes the EAM 102, a semiconductor optical amplifier (SOA) 452, and a feedback circuit 104″ that linearizes the optical transmitter 450. The optical transmitter 450 is similar to the optical transmitter 100 of FIG. 1 except that the optical transmitter 450 includes the SOA 452. In addition, the feedback circuit 104″ is designed to adjust at least one of the SOA bias signal and the laser bias signal to reduce distortion generated by the EAM 102.

The optical transmitter 450 includes a SOA bias power supply 454 having an output 456 that is electrically connected to an input 458 of the SOA 452. The SOA bias power supply 454 also includes a control input 460 that is electrically connected to a second output 462 of the control circuit 150″. The SOA bias power supply 454 generates a bias signal that biases the SOA 452 at an operating point that is determined by a control signal that is generated by the control circuit 150″ at the second output 462.

In one embodiment, the laser bias power supply 110 includes a control input 464 that is electrically connected to a third output 466 of the control circuit 150″. The laser bias power supply 110 generates a bias signal at the output 112 in response to a control signal that is generated by the control circuit 150″ at the third output 466. The control signal causes the laser bias power supply 110 to generate a bias signal that biases the laser 106. The laser 106 is biased at an operating point that causes the laser 106 to emit an optical signal at the output 108 that has the desired wavelength and the desired power level. In some embodiments, the control signal causes the laser bias power supply 110 to generate a bias signal that biases the laser 106 at an operating point that causes the laser 106 to emit an optical signal at the output 108 that reduces or minimizes the distortion generated by the EAM 102.

In operation, the control circuit 150″ receives the electrical feedback signal generated by the detector 146 and processes the electrical feedback signal according to an algorithm. The control circuit 150″ generates a control signal at the output 154 according to the algorithm that causes EAM bias voltage supply 118 to generate a bias signal that biases the EAM at a level that reduces or minimizes distortion generated by the EAM 102.

Also, the control circuit 150″ generates a control signal at the output 462 according to an algorithm that biases the SOA 452 at a level that reduces or minimizes distortion generated by the EAM 102. In addition, in one embodiment, the control circuit 150″ generates a control signal at the output 466 that biases the laser 106 at a level that reduces or minimizes distortion generated by the EAM 102, while maintaining the optical signal generated by the laser 106 at an appropriate power level and wavelength.

Figure 9:
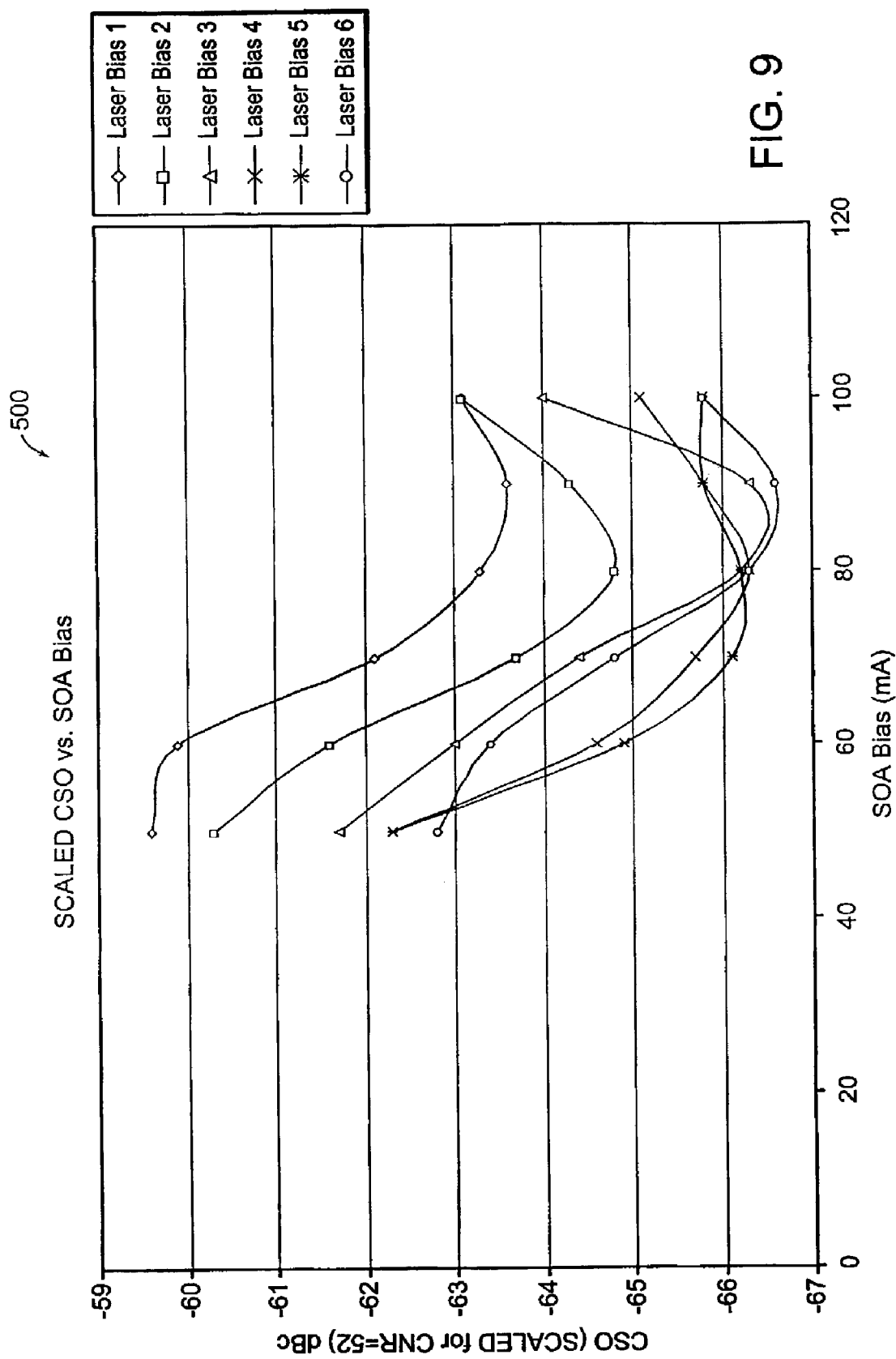
FIG. 9 illustrates experimental data for CSO distortion vs. semiconductor optical amplifier (SOA) bias current that indicates the effect of SOA bias on modulator linearity for six different laser bias currents.

FIG. 9 illustrates experimental data 500 for CSO distortion vs. semiconductor optical amplifier (SOA) bias current that indicates the effect of SOA bias on modulator linearity for six different laser bias currents. The data 500 illustrates that CSO distortion nulls are a function of both the SOA bias current and the laser bias current. The laser bias current was increased from laser bias current 1 to laser bias current 6. SOA bias current was approximately equal to the SOA saturation current. The data 500 indicates that the CSO distortion is lowest when the SOA is operated near saturation. The data 500 also indicates that the current generated in the EAM 102 by photo absorption affects the optimum bias point for the EAM 102.

EQUIVALENTS

While the invention has been particularly shown and described with reference to specific embodiments, it should be understood by those skilled in the art that various changes in form and detail may be made therein without departing from the spirit and scope of the invention as defined herein.

What is claimed is:

1. A method of linearizing a modulated optical signal, the method comprising:
   a) measuring an electrical signal generated by modulating an optical signal with an electro-absorption modulator biased with a modulator bias signal without optical-to-electrical conversion of the modulated optical signal, the measured electrical signal comprising electrical distortion signals caused by photo absorption non-linear affects;
   b) generating an electrical feedback signal in response to the measured electrical signal, the electrical feedback signal being proportional to an amplitude of at least one electrical distortion signal; and
   c) adjusting the modulator bias signal in response to the electrical feedback signal to reduce an amplitude of the at least one electrical distortion signal.

2. The method of claim 1 wherein the at least one electrical distortion signal comprises a group of similar electrical distortion signals.

3. The method of claim 1 wherein the at least one electrical distortion signal comprises a composite second-order distortion product.

4. The method of claim 1 wherein the at least one electrical distortion signal comprises a composite triple beat distortion product.

5. The method of claim 1 wherein the at least one electrical distortion signal comprises a fifth-order electrical distortion signal.

6. The method of claim 1 wherein the generating the electrical feedback signal comprises processing the electrical signal generated by modulating the optical signal to separate at least one electrical distortion signal from the electrical distortion signals.

7. The method of claim 1 wherein the at least one electrical distortion signal comprises a first and a second group of electrical distortion signals and the electrical feedback signal is proportional to an amplitude of one of the first and the second group of electrical distortion signals.

8. The method of claim 1 wherein the adjusting the modulator bias signal in response to the electrical feedback signal comprises minimizing the amplitude of the at least one electrical distortion signal.

9. The method of claim 1 further comprising adjusting a bias signal that biases a laser that generates the optical signal, the bias signal being adjusted so as to reduce an amplitude of the at least one electrical distortion signal.

10. The method of claim 9 wherein the bias signal that biases the laser causes the laser to generate the optical signal with a wavelength in a desired wavelength range.

11. The method of claim 1 further comprising amplifying the optical signal with a SOA.

12. The method of claim 11 further comprising adjusting a bias signal applied to the SOA so as to minimize the at least one electrical distortion signal.

13. A linearized optical transmitter that generates a modulated optical signal, the transmitter comprising:
   a) a modulator bias voltage supply having a control input, the modulator bias voltage supply generating a bias voltage at an output in response to a signal applied to the control input;
   b) an EAM having a bias input that is electrically connected to the output of the modulator bias voltage supply, a modulation input that receives a payload modulation signal and an optical input that receives an optical signal, the EAM modulating the optical signal with the payload modulation signal and generating electrical distortion signals at a port without optical-to-electrical conversion of the modulated optical signal; and
   c) a feedback circuit having an input that is electrically coupled to the port and having an output that is electrically coupled to the control input of the modulator bias voltage supply, the feedback circuit receiving the electrical distortion signals and generating a control signal at the output in response to at least one electrical distortion signal generated at the port, wherein the control signal changes the bias voltage generated by the modulator bias voltage supply so as to reduce the at least one electrical distortion signal.

14. The optical transmitter of claim 13 wherein the EAM comprises a semiconductor active region having a composition and a structure that is designed to reduce electrical distortions generated by the EAM.

15. The optical transmitter of claim 13 wherein at least one physical parameter of an active layer of the EAM is chosen to increase a bias voltage that minimizes the at least one electrical distortion signal.

16. The optical transmitter of claim 13 wherein the feedback circuit comprises an electrical filter that separates the at least one electrical distortion signal from the electrical distortion signals.

17. The optical transmitter of claim 13 wherein the feedback circuit comprises a first and a second electrical filter that separates a first and a second group of electrical distortion signals, respectively.

18. The optical transmitter of claim 13 wherein the control signal changes the bias voltage generated by the modulator bias voltage supply so as to minimize the at least one electrical distortion signal.

19. The optical transmitter of claim 13 wherein the control signal changes the bias voltage generated by the modulator bias voltage supply so as to minimize a composite electrical distortion signal generated by the optical modulator at the port.

20. The optical transmitter of claim 13 wherein the at least one electrical distortion signal comprises a group of similar electrical distortion signals.

21. The optical transmitter of claim 13 wherein the at least one electrical distortion signal comprises composite a second-order electrical distortion signal.

22. The optical transmitter of claim 13 wherein the at least one electrical distortion signal comprises a composite triple beat electrical distortion signal.

23. The optical transmitter of claim 13 wherein the at least one electrical distortion signal comprises a fifth-order electrical distortion signal.

24. The optical transmitter of claim 13 further comprising a SOA that amplifies the optical signal.

25. The optical transmitter of claim 13 wherein the feedback circuit comprises a nulling servo circuit.

26. A linearized optical transmitter that generates a modulated optical signal, the transmitter comprising:
   a) means for measuring an electrical signal generated by modulating an optical signal with an optical modulator biased with a modulator bias signal without optical-to-electrical conversion of the modulated optical signal, the measured electrical signal comprising electrical distortion signals caused by non-linear effects in the optical modulator;

b) means for generating an electrical feedback signal in response to the measured electrical signal, the electrical feedback signal being proportional to an amplitude of at least one of the electrical distortion signals; and c) means for adjusting the modulator bias signal in response to the electrical feedback signal to reduce an amplitude of the at least one electrical distortion signal.

* * * * *